United States Patent [19]

Else et al.

[11] Patent Number: 4,862,774
[45] Date of Patent: Sep. 5, 1989

[54] SCREW HOLDER

[76] Inventors: Frederick A. Else, 21 Biccard Street, Turffontein, Johannesburg, Transvaal Province; John Green, 403 Westmoreland, Tudhope Avenue, Berea, Johannesburg, Transvaal Province, both of South Africa

[21] Appl. No.: 159,934

[22] Filed: Feb. 24, 1988

[30] Foreign Application Priority Data

Feb. 24, 1987 [ZA] South Africa .................. 87/1322

[51] Int. Cl.4 .............................................. B25B 23/02
[52] U.S. Cl. ........................................ 81/57.37; 81/454
[58] Field of Search ................................ 81/57.37, 454

[56] References Cited

U.S. PATENT DOCUMENTS

| 1,503,861 | 8/1924 | Stimpson | 81/57.37 X |
| 2,261,134 | 11/1941 | Blair | 81/57.37 X |
| 3,907,014 | 9/1975 | Manino | 81/57.37 X |
| 3,960,191 | 6/1976 | Murray | 81/57.37 |
| 4,003,417 | 1/1977 | Cornwell | 81/57.37 |
| 4,204,439 | 5/1980 | Kondo | 81/57.37 |
| 4,295,394 | 10/1981 | DeCaro | 81/57.37 |
| 4,462,283 | 7/1984 | Ito | 81/454 X |

Primary Examiner—James G. Smith
Attorney, Agent, or Firm—Birch, Stewart, Kolasch & Birch

[57] ABSTRACT

A screwholder device comprising jaws which form two halves of an axial passageway down which a screw is driven. The jaws are hinged at the rearmost end and resiliently held together by a narrowing at the front exit ends. The screw is driven down the passageway and is held by the jaw ends while being driven to a certain extent into a surface, and the screwhead pushes the jaws apart to allow the screw to exit from the device during final securement of the screw.

11 Claims, 1 Drawing Sheet

SCREW HOLDER

BACKGROUND TO THE INVENTION

The present invention relates to a screw holder of the kind that holds screws whilst being driven by power drive means.

A variety of such holders are well known. One such device forms an integral tool with an electric motor and handgrip, and utilises a barrel with an inclined shaft for the insertion of a screw into the barrel. The barrel is axially movable relative to the screwdriver being driven by the motor. This axial movement drives the screw down the barrel to two transverse sliding grips, which initially hold the screw steady while it is driven and then move apart under force of the screwdriver head, to allow the screw to be driven finally out of the device.

It is considered that the existing screw holding devices are unnecessarily complicated, having numerous parts and being difficult to open per servicing, or to clear if a screw has become jammed.

It is an object of the present invention to provide a screw holder device.

SUMMARY OF THE INVENTION

In accordance with the present invention there is provided a screw holder device comprising two barrel jaws adapted to be held together to define a passageway surrounding and supporting at least a part of the length of a screw being driven therethrough in use from a throat to an exit. The jaws are hinged behind the exit ends so as to be pivotable apart to split the passageway and allow a screwhead to pass out of the device in use.

A further feature of the present invention provides for the jaw length to allow the passageway to extend for at least the length of a screw intended to be held in use, with the passageway section behind the throat being wide enough to receive the screwdriver shaft driving the screw in use.

The present invention also provides for a breech opening leading to the passageway and being adapted to permit the screw to be passed through it into the passageway in a position ready for driving. In this instance the breech opening is preferably formed by both jaws when located together, and in particular the breech opening extends to join the passageway which is inclined at an acute angle, but curve towards the passageway when it joining in a shape adapted to prevent shorter screws from tumbling into the passageway on being loaded through the breach opening in use.

Preferably the jaws have grooves adapted to receive a biasing member therearound for resiliently holding jaws together. The grooves in the jaws preferably form, when the jaws are brought together, a circumferential groove arranged to receive biasing means in the form of a resilient ring.

The jaws are preferably hinged to a support at their rearmost ends in the direction of the screw feed, and the support is adapted to be secured to a power tool for driving a screwdriver in the device.

The support also allows for resilient axial movement of the jaws over a disposed screwdriver in the jaw passageway when in use. This allows the screwdriver to move through the jaws when driving a screw out of the holder.

The support is formed by two metal plates pressed together around hinge pins, which hold the rearmost portions of the jaws together in a central opening in the plates.

It is also provided that the rearmost portion of the passageway is wider than the middle portion thereof in order to receive a screwdriver or in order to receive an adaptor tube which screws in use onto the surrounding parts of a power tool, and carries a screwdriver tool axially and rotatably disposed therein.

BRIEF DESCRIPTION OF THE DRAWINGS

A preferred embodiment of the present invention is described below by way of example only, and with reference to the accompanying drawings, wherein.

DETAILED DESCRIPTION WITH REFERENCE TO THE DRAWINGS

Figure 1:
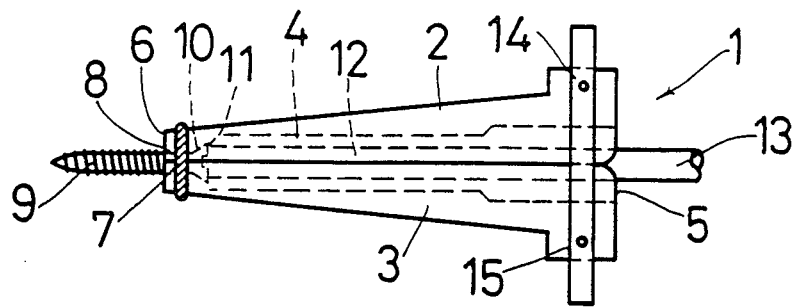
FIG. 1 is a plan view of two jaws forming a screwholder according to the present invention.

Referring to FIG. 1, a screw holding device indicated generally at (1) comprises two barrel jaws which are axial halves which form, when brought together, a screw passageway (4) extending from the rearmost end (5) in the direction of the screw feed, to the exit end (6).

The two jaw halves (2) and (3) have at the exit end a narrowed passageway section (7) which is arranged to surround and support a section (8) of the length of a screw (9) being driven therethrough in use.

The passageway (8) extends from the exit end (6) rearwardly and curves to widen out through a throat section (10) which is arranged to co-operate with the head (11) of the screw (9) for opening out the jaws as will be described in more detail below. The passageway extends from the throat rearwardly at a widened diameter (12) which can receive a screwdriver shaft (13) driven through from the rearmost end (5).

Figure 2:
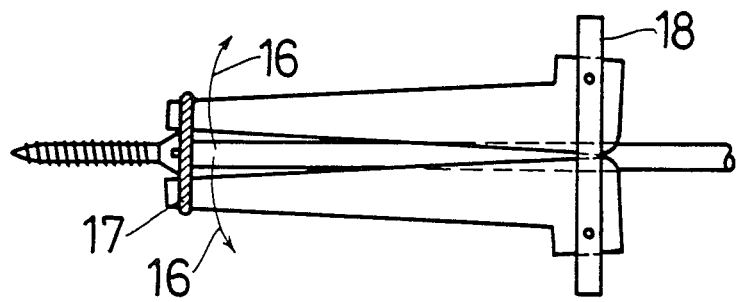
FIG. 2 is a plan view of the holder of FIG. 1 with a screw being ejected therefrom.

The jaws (2) and (3) at the rearmost end are each hinged by hinge pins (14) and (15) respectively parallel to the diameter of the split through the passageway (12), so that the jaws can pivot at the exit end around the hinge points, (as indicated in FIG. 2 by arrows (16)) to split the passageway surrounding section (8) all the way down to the rearmost end (5). This split allows the screwdriver shaft (13) to push the screw (9) out of the holder for final driving it home into a secured position.

It will be understood that the adjacent jaw surfaces at the rearmost end will have to have a certain amount clearance to allow the pivoting action to occur. The rear jaws ends are thus held together by the hinge pins, which are located in a support frame (18), and at the exit end by a resilient rubber 'O' ring (17) disposed in a suitable groove for keeping the jaw ends together.

Figure 3:
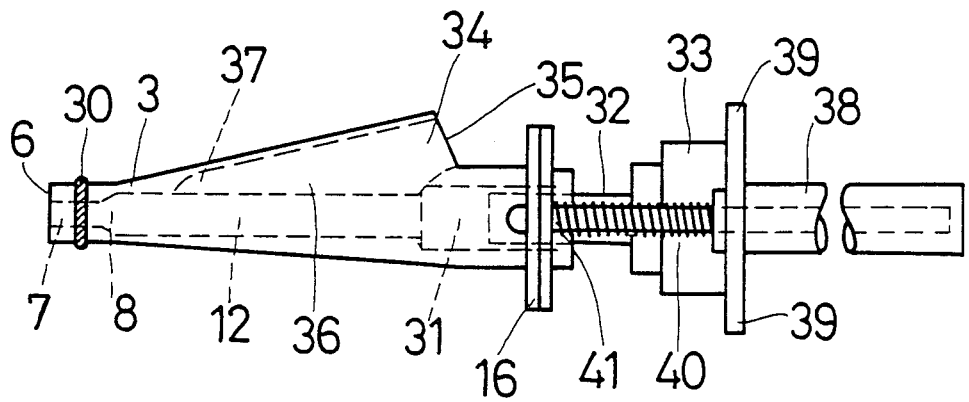
FIG. 3 is a side view of the holder of FIGS. 1 and 2 showing more details of the passageways therein and the support means.

Referring now to FIG. 3, a side view of the holder of FIGS. 1 and 2 is shown, with additional features. The jaws (3), are shown with the groove (30) located circumferentially a short distance from the end (6), for receiving an 'O' ring. The narrow passageway (7) for surrounding and supporting the screw section is shown in dotted lines, leading to the throat portion (8) which receives the screwhead (11).

From there, the passageway extends rearwardly through a section (12), as described with reference to FIGS. 1 and 2, which is wide enough to receive a screwdriver shaft. Towards the rearmost portion however, the shaft widens in a step-like manner to a wider diameter portion (31) which is sufficiently wide to receive the tube (32) of an adaptor (33), which is secured to the outer portion of a power driving means (not shown) and carries the screwdriver shaft axially and rotatably therein. Such adaptor pieces, in principle, are known.

The jaws extend in the operatively upward direction to form axial halves defining a breech opening (34) with an entrance (35) leading downwardly and away from the rearmost side to join the passageway (12) at a position (36). The breech opening is curved towards the passageway at a position (37) as it joins the passageway to allow screws loaded in the breech opening to slide down and into the passageway without tumbling and ending up in the passageway in reverse position.

The support framework (16) comprises sheet metal sections pressed together around the hinge pins, with a central opening in which the rearmost jaw ends are fitted. Each end of the support framework has a rod (41) extending rearwardly to be axially slidable within a holding tube (38) spaced apart and secured to a tool framework (39). The framework (39) can be secured rigidly to the power tool (not shown), and each rod (37) is spring biased by a compression spring (40) against sliding axially within its tube (38). Oppositely directed spring biasing on the rod, as is known in the art, is also provided within the tube.

In use, the holding device is secured by the framework (39) rigidly to the end of a power tool, most commonly in the form of an electric drill. The adaptor (33) is secured around the drill chuck assembly, and a suitable screwdriver is secured in the chuck. Other adaptors with torque limiting clutches may be used. The jaws are slid away from the tool against the opposite biasing, to clear the screwdriver from the passageway. A screw is then loaded into the holding device through the breech opening (34), and is allowed to slide down the inclined slope under the force of gravity and guided by the curve (37) into the passageway. The jaws are the relaxed and moved by biasing spring (40) back to their original position, and the screwdriver slides forward in the passageway to engage the screwhead and drive the screw shaft to project from the holder, with the head of the screw being disposed in the throat.

The tool and holding device is then pressed against the surface where the screw is to be secured, with the exit end (6) being pressed up against the exact position of intended securement.

The power tool is then operated to drive the screwdriver, and drive the screw into the surface.

The supporting section (7) holds the screw while it is being driven into the surface. When the screw shaft is driven into the surface up to the exit end (8), further pressing of the power tool and driving of the screw pushes the screwhead against the jaws, exerting an opening force against the biasing of the rubber 'O' ring, and causing the jaws to pivot open around the hinge pins, as described with reference to FIG. 2. The screw is now sufficiently secure in its surface without the support of the jaws, and the screw is finally driven home while exiting from the holder.

The present invention provides a simple and effective screw holder. The holder has only two primary components, that is the two jaws, which can be opened very easily by removal of the 'O' ring for servicing or for freeing any jam. The tool can easily be connected to a wide variety of separate power tools, and is not necessarily confined to use as a dedicated power screwdriver.

Variations may be made to the above embodiment without departing from the scope of the invention. For example, an integral barrel or body containing a passageway may nevertheless be used, with only the screw holding section being hinged and split to be movable apart and allow the screw to exit. Similarly, as is known in the art, the actual mechanism whereby the jaws are finally forced apart to let the screw out need not be the action of the screwhead against the movable parts, but may be operated by any interacting means between the advancing screwdriver shaft, power tool or adaptor or the like.

What I claim as new and desire to secure by Letters Patent is:

1. A screwdriver device comprising two barrel jaws having front ends and rear ends, said jaws being hinged at their rear ends to define in a closed position, a passageway for housing a screw to be driven there through said jaws also being shaped to define, when forming the passageway, a breech opening leading to said passageway for introducing the screws into the passageway when in use, said jaws being pivotable apart when in use to split the passageway and the breech and allow a screw to pass out of the front end of the passageway, said jaws being hinged behind the intersection of the passageway with the breech opening, to pivot about positions on opposite sides of the axis of the operatively formed passageway.

2. The device as claimed in claim 1 wherein each jaw forms approximately one half of the passageway and breech opening.

3. The device as claimed in claim 1 wherein the breech opening extends to joint the passageway, inclined at an acute angle thereto, and curves towards the passageway on joining it in a shape adapted to prevent shorter screws from tumbling into the passageway on being loaded through the breech opening in use.

4. The device as claimed in claim 1 wherein the front ends of the jaws contain means for receiving a biasing means therearound for resiliently holding the jaws together.

5. The device as claimed in claim 4 wherein the receiving means in the jaws are a circumferential groove which is adopted to receive a biasing means in the form of a resilient ring.

6. The device as claimed in claim 1 wherein the jaws are hinged to a support at their rear ends in the direction of the screw feed, and the support is adapted to be secured to a power tool for driving a screwdriver bit in the device.

7. The device as claimed in claim 6 wherein the jaws are resiliently and axially movable relative to the support to move over a screwdriver bit disposed in the jaw passageway when in use, to allow the screwdriver bit to drive a screw operatively out of the passageway.

8. The device as claimed in claims 6 or 7 wherein the support is formed by two metal plates pressed together around hinge pins which hold the rearmost portions of the jaws together in a central opening on the plates.

9. The device as claimed in claim 8 wherein the rearmost position of the passageway is sufficiently wide to receive, in use, an adaptor tube which is screwable onto the surrounding parts of a power tool, and carries when in use, a screwdriver bit axially and rotatably disposed therein.

10. The device as claimed in claim 1 wherein the front end of the passageway has a throat portion which is shaped to operate as a cam surface when force from an axially driven screwhead is exerted thereon, to pivot open the jaws and split the passageway to allow the screw to pass out of the device when in use.

11. The device as claimed in claims 6 or 7 wherein the support is formed of a plastics material holding two hinge pins, which hold the rear portions of the jaws together to each side of a central opening in the support arranged to allow access for a screwdriver bit to the operative passageway.

* * * * *